Patented July 8, 1952

2,602,727

UNITED STATES PATENT OFFICE 2,602,727

PRODUCTION OF ZINC OXYSULFATE

Warren D. Warinner and Edward H. Conroy, College Park, Ga., assignors to Tennessee Corporation, New York, N. Y., a corporation of New York No Drawing. Application October 27, 1948, Serial No. 56,908

2 Claims. (Cl. 23—125)

This invention relates to the manufacture of zinc oxysulphate which is especially well suited for agricultural uses, although the product can be used for any other desired purpose.

Zinc is an essential mineral element and must be used for the control of deficiency diseases in the case of various crops grown in zinc-deficient soils. It is also effective to control "bacterial spot" on peaches, and acts synergistically with copper fungicides to render them more effective. Furthermore zinc acts as a protectant or "safener" in sprays and dust mixtures to prevent arsenical injury to various fruits and vegetables, and in addition improves adherence.

For these reasons zinc is an important element in agriculture. However, many readily available zinc compounds are not suitable for agricultural uses. For example, soluble zinc salts such as zinc sulphate can not be applied directly to fruits and vegetables because of their astringent nature and harmful effect, and zinc oxide although an insoluble protectant is toxic to plant life. Hence the usual practice has been to treat zinc sulphate with an excess of hydrated lime which converts the zinc sulphate into a basic or oxysulphate. The oxysulphate being only slightly soluble, zinc injury is avoided but sufficient zinc ions are liberated to produce the beneficial effects mentioned above to a substantial extent. The excess lime may simply be added in the spray tank or dust mixture, or ready-mixed dusts or sprays may be manufactured by procedures such as disclosed in U. S. Patent No. 1,943,181.

On the other hand, the presence of excess lime in such basic zinc sulphate preparations gives rise to serious disadvantages. The lime carbonates on the plant and reacts with lead arsenate residues to form calcium arsenate and more soluble arsenic which may deplete the zinc safener. A large excess of lime gives protection but forms a thick residue that interferes with photosynthesis and weakens the plant from excessive transpiration. Moreover, free hydrated lime causes a considerable loss in effectiveness of certain important insecticides such as nicotine alkaloid (Black Leaf 155), rotenone, and organic insecticides such as dichloro-diphenyltrichlorethane (DDT), benzene hexachloride, etc.

Furthermore, the above procedures for preparing basic zinc sulphate are wasteful and inefficient since a large part of the sulphuric acid required to acidulate the zinc in the first instance is converted into inactive calcium sulphate, and moreover the latter forms an inert diluent in the resulting product which therefore is relatively low in zinc content.

Early investigators such as Vogel, Schweigers Journal, vol. 11, 408–418 (1814), Schindler, Magazin fur Pharmacie, vol. 31, 167–186 (1830), Athanasesco, Camp. Rend., vol. 103, 271–272 (1886), and Kraut, Zeit. Anorg. Chem., vol. 13, 1–15 (1897) reported the preparation of zinc trioxysulphate by dissolving small amounts of zinc oxide in a considerable excess of boiling zinc sulphate solution. Reference to these articles shows that in each case the hot liquors were filtered and the products recovered by crystallization from the cooled filtered solutions. This method of preparation is inefficient and not adapted to commercial application.

One of the objects of the present invention is to provide a simple economical process for producing zinc oxysulphate substantially free of undesirable by-products and lime and capable of safe and effective use for agricultural purposes such as those mentioned above without the addition of hydrated lime.

Another object is to produce such zinc oxysulphate having a relatively high zinc content, the molar ratio of zinc to sulphur being not less than about 4:1 and preferably higher.

Still another object is to avoid the difficulties involved in the prior inefficient, impractical laboratory procedures mentioned above and to form directly solid zinc oxysulphates of 4:1 or higher ratios of zinc to sulphur by a simple practical process adapted for commercial application.

A further object is to complete the chemical reactions involved and precipitate the zinc oxysulphate in a slurry that can be spray-dried, thus making it possible to eliminate filtering the slurry and washing, drying and pulverizing the filtered material.

A further object is to produce an effective zinc-bearing compound which can be incorporated into dusting and spraying mixtures at the packaging plant, thereby eliminating the dangers of omission or improper addition to such mixtures in the field.

The foregoing objects are accomplished by a novel process wherein zinc oxysulphate of relatively high zinc content as mentioned above is formed by the direct and substantially complete reaction in water of the proper molar quantities of zinc oxide and zinc sulphate or sulphuric acid. The reaction forms an aqueous slurry of precipitated zinc oxysulphate which can readily be filtered, dried and ground or pulverized but preferably is directly spray-dried to provide the final product.

In studying this reaction, it was found that the least basic material obtainable was zinc trioxysulphate (ratio of Zn to S=4/1), and that this product could be obtained only with sufficient zinc sulphate, high temperature, and prolonged reaction time. Accordingly at least three mols of zinc oxide and not more than one mol of zinc sulphate should be used for the reaction, or at least four mols of zinc oxide and not more than one mol of sulphuric acid. However, higher zinc content is desirable for agricultural uses, and further when a small amount of calcium hydroxide is added to expedite completion of the reaction as explained hereinafter, the trioxysulphate and the heptoxydisulphate are converted to more basic sulphates such as the tetroxysulphate ($ZnSO_4.4ZnO.4H_2O$; ratio of Zn to S=5/1). For these reasons it is preferred to use in the present process not more than one mol of zinc sulphate with at least four mols of zinc oxide, and when the reactants are zinc oxide and sulphuric acid, the amount of sulphuric acid preferably is not more than that required to acidulate one-fifth or 20 per cent of the zinc. Still lesser amounts of sulphuric acid (or zinc sulphate) may be employed to produce oxysulphates of still higher zinc content such as the pentoxy and heptoxy sulphates as explained hereinafter.

Boiling temperatures can be used but best results are obtained with temperatures not greater than 190° F., the preferred temperature range being 160°–190° F. Lower temperatures can be used down to about 120° F., but the required reaction time will be correspondingly increased.

The amount of water is not critical but preferably should be enough to provide a fairly dilute slurry in the neighborhood of 25% solids by weight at the start of the reaction. The upper limit of solids is the point at which the slurry becomes too thick during the course of the reaction for effective agitation, which may take place if the solids content at the start of the reaction is greater than 30–35%. More dilute slurries can be used but are disadvantageous because of slower reaction, and also because in case of spray drying there is a correspondingly larger quantity of water to be removed.

Assuming the use of molar quantities of zinc oxide and sulphuric acid such as to produce the tetroxysulphate, the process may be carried out very simply and effectively by diluting one mol of sulphuric acid with part of the calculated amount of water, preparing a slurry containing five mols of zinc oxide with the rest of the water, mixing the two and heating the mixture with agitation at a temperature of 180°–190° F. The extent of dilution of the sulphuric acid and the degree of concentration of the zinc oxide slurry may vary within wide limits, provided the total amount of water conforms to the conditions prescribed above.

The sulphuric acid reacts with one-fifth of the zinc oxide to form 1 mol of zinc sulphate which in turn reacts with the remaining four mols of zinc oxide to form the tetroxysulphate. Hence it will be understood that if desired, the starting materials may be 1 mol of zinc sulphate and four mols of zinc oxide.

The reaction proceeds rapidly at first but becomes progressively slower, reaching about 98% completion under the above conditions in 12 to 24 hours by which time the pH of the slurry will have increased to about 6.45–6.50, the pH determinations being made on the slurry cooled to a uniform temperature of 75° F. without removing solids. If the reaction is stopped at this point, which will be convenient in most cases, there will still be around 7–8% of the original zinc sulphate remaining in soluble form with resulting danger of injury to the plant if the dried product should be used for agricultural purposes. To avoid this danger, the slurry may be filtered and the filter cake washed to remove remaining soluble zinc, after which the washed filter cake can be dried and pulverized or reslurried and spray dried. On the other hand, the reaction can be carried substantially to completion if enough time is allowed, at which point the slurry will be approximately neutral (pH 6.8 or 6.9). In this case the slurry can be filtered and dried without washing, or preferably is directly spray dried.

To eliminate washing and at the same time avoid prolonging the time of the reaction, however, enough alkali is preferably added to precipitate substantially all of the remaining soluble zinc. Hydroxides of any alkali or alkaline earth can be used for this purpose. The amount of by-product sulphate thus formed is so small that it does not dilute the resulting product materially, and can be allowed to remain in the product even for agricultural purposes since it is practically harmless in such small amounts. Hence the finished slurry is preferably directly spray dried to obtain oxysulphate.

We prefer to use calcium hydroxide for the above purpose because it is economical and the by-product calcium sulphate is non-injurious. When calcium hydroxide is used in the above manner to precipitate substantially all of the soluble zinc remaining at the end of the reaction described above, the product will range from the tetroxysulphate to the pentoxy sulphate in composition as illustrated by the examples set forth below.

The elimination of the steps of filtering, washing, drying and grinding and the substitution of a simple spray drying operation are important advantages of the invention. The realization of these advantages is due in part to the finely divided granular character of the solids and to the absence of harmful amounts of soluble by-product sulphates in the accompanying liquors. In contract, zinc oxysulphates as ordinarily prepared in quantity by the action of alkali on zinc sulphate are precipitated as gelations, slimy solids in the presence of a considerable concentration of harmful soluble sulphates from which they must be separated by filtration and washing. These gelatinous precipitates are difficult to filter and wash, and when dried are tough and very difficult to grind; furthermore, such filtered and washed products are difficult to disperse and hence are not suitable for spray drying.

The finely divided granular precipitates obtained by the present invention are easily filtered, washed, dried and pulverized, or easily spray dried. Moreover, these precipitates do not contain objectionable impurities in the form of either unreacted materials or by-products and hence the slurries can be spray dried directly.

Higher basic products can be obtained by stopping the reaction before the point mentioned above is reached. However, when the product is intended for agricultural use, the pH of the reaction mixture should be allowed to increase at least to about 6.0 to make sure that substantially all the zinc oxide is decomposed, since zinc oxide is toxic to plant life as stated above. At this point the product obtained will be of the order of the hexoxysulphate and can be recovered by filtering, washing and drying. Also precipitation of the remaining soluble zinc can be accomplished by the addition of calcium hydroxide or the like and the slurry then spray dried, although the product obtained will be diluted by a relatively large amount of by-product sulphate which is undesirable for many purposes. Furthermore, products of the order of the heptoxysulphate can be formed rapidly by adjusting the molar quantities of the reactants to satisfy this relation. The basicity of the final product can also be increased by adding sufficient calcium hydroxide or the like at the end of the reaction to bring the pH to approximately 8.0 or higher.

A specific example of the present process, based on the use of the preferred molar proportions stated above, is as follows:

One hundred pounds of zinc oxide (81.3% Zn) were slurried with 185 lbs. or 22 gallons of water to provide a slurry containing 35% solids by weight. The amount of $H_2SO_4$ required to combine with one-fifth or 16.3 lbs. of the zinc was 24.5 lbs. which was equivalent to 122.5 lbs. of 20% acid. This dilute acid solution was made up by diluting 31.5 lbs. of 60° Bé. acid with 90.5 lbs. or 10.9 gallons of water, making a total volume of 12.8 gallons.

The zinc oxide slurry was added slowly to the dilute acid, the total volume of the mixture including rinsings being approximately 43.5 gallons. This mixture was agitated at 180°–190° F. until a pH of 6.45–6.50 was reached, the time required being about 15 hours. At this point about 7% or 1.2 lbs. of soluble zinc remained unprecipitated. The slurry was approximately 92% solution and 8% solids by volume or 28% solids by weight. The apparent volume of the solution was 43.5 gallons.

At this stage the slurry can be filtered and the filter cake washed free of soluble sulphates in a filter press. The remaining product can either be dried and pulverized, or reslurried and spray dried. However, it will usually be preferable to complete the reaction by the addition of lime which was done in the case of above slurries by the following procedure.

Under the reaction conditions set forth above, it was sufficiently accurate to assume that the amount of soluble zinc left in solution at pH 6.45–6.50 was about 3.5 grams per liter or 0.03 lb. per gallon. The total amount of soluble zinc was then calculated by multiplying these amounts by the apparent volume of the solution and by the factor 0.92 representing the approximate actual volume of the solution. With an apparent volume of 43.5 gallons as in the above example, the calculated amount of soluble zinc remaining in solution was 1.165 lbs. and the required amount of calcium hydroxide calculated to form tetroxysulphate was 1.06 lbs. Equivalent amounts of lime (allowing for any $CaCO_3$ present in the lime) were dispersed in about 2 gallons of water which were added to the reaction tank at a uniform rate over a period of about five minutes to avoid high concentration of lime in a limited part of the slurry. The slurry was agitated while its pH rose slowly to 7.0, by which time the soluble zinc content had decreased to about 0.35 gram per liter, 99% of the soluble zinc had been precipitated, and over 99.9% of the total zinc was in insoluble form. Such slurries can be filtered, dried and pulverized without washing, or they can be directly spray dried.

The following table gives the analyses of a number of products prepared according to the procedure of the above example. In most of these tests the slurry was cooled to 80°–100° F. before completing precipitation with calcium hydroxide, in order to accomplish this final precipitation faster and with a minimum of side reaction to higher oxysulphates and consequently a minimum consumption of lime. The table shows the results obtained when the precipitated solids were filtered, washed and dried without adding lime (see "A" samples) and when precipitation was completed by adding lime to pH=7.0 (see "B" samples). The oxysulphates thus obtained ranged in composition from the tetroxy to the pentoxy sulphate (ratio of Zn to S from 5/1 to 6/1). However, field tests of agricultural sprays and dusts containing oxysulphates varying in composition within this range disclosed no difference in their effectiveness.

| Batch No. | Per Cent CaSO4 | Per Cent Zn | | Per Cent S | | Mol. Zn per Mol. S [1] | Formula |
|---|---|---|---|---|---|---|---|
| | | Total | H2O-Sol | Total | H2O-Sol | | |
| 1-A | 0 | 58.75 | 0.55 | 5.75 | 0 | 5.0 | $ZnSO_4.4ZnO.xH_2O$ |
| 1-B | 5.1 | 54.9 | 0.40 | 5.83 | 1.43 | 6.1 | $ZnSO_4.5.1ZnO.xH_2O$ |
| 2-B | 4.2 | 53.0 | 0.10 | 5.74 | 0.66 | 5.2 | $ZnSO_4.4.2ZnO.xH_2O$ |
| 3-A | 0 | 59.6 | 0.30 | 5.63 | 0.12 | 5.3 | $ZnSO_4.4.3ZnO.xH_2O$ |
| 3-B | 2.2 | 57.3 | 0.30 | 5.73 | 0.66 | 5.5 | $ZnSO_4.4.5ZnO.xH_2O$ |
| 4-A | 0 | 58.6 | 0.60 | 5.71 | 0.19 | 5.2 | $ZnSO_4.4.2ZnO.xH_2O$ |
| 4-B | 1.6 | 55.9 | 0.35 | 5.84 | 0.47 | 5.1 | $ZnSO_4.4.1ZnO.xH_2O$ |
| 5-A | 0 | 58.4 | 0.30 | 5.76 | 0.13 | 5.1 | $ZnSO_4.4.1ZnO.xH_2O$ |
| 5-B | 1.3 | 56.8 | 0.35 | 5.83 | 0.36 | 5.1 | $ZnSO_4.4.1ZnO.xH_2O$ |
| 6-A | 0 | 57.1 | 0.3 | 5.44 | 0.11 | 5.2 | $ZnSO_4.4.2ZnO.xH_2O$ |
| 6-B | 2.1 | 53.9 | 0.19 | 5.45 | 0.48 | 5.3 | $ZnSO_4.4.3ZnO.xH_2O$ |
| 7-A | 0 | 58.5 | 0.25 | 5.75 | 0.12 | 5.0 | $ZnSO_4.4ZnO.xH_2O$ |
| 7-B | 1.3 | 56.45 | 0.20 | 5.74 | 0.35 | 5.1 | $ZnSO_4.4.1ZnO.xH_2O$ |
| 8-B | 1.8 | 55.9 | 0.20 | 5.77 | 0.49 | 5.2 | $ZnSO_4.4.2ZnO.xH_2O$ |
| 9A | 0 | 57.7 | ------ | 5.34 | ------ | 5.4 | $ZnSO_4.4.4ZnO.xH_2O$ |
| 9B | 2.5 | 54.8 | 0.38 | 5.43 | 0.65 | 5.6 | $ZnSO_4.4.6ZnO.xH_2O$ |
| 10B | 1.7 | 55.4 | 0.40 | 5.43 | 0.62 | 5.6 | $ZnSO_4.4.6ZnO.xH_2O$ |

A—Precipitated solids before adding lime (filtered, washed and dried).
B—Precipitated solids after adding lime (filtered and dried cake).
[1] This ratio is based on the water-insoluble quantities.

Apart from the important procedural advantages mentioned above, the product obtained by the foregoing process is exceptionally well suited for agricultural uses because of its high zinc content and very low content of water-soluble zinc as indicated in the above table, and because it is free of by-products harmful to plant life and can be used without the addition of lime.

It will be understood that the invention is not restricted to the details set forth above by way of example and that reference should be had to the appended claims for a definition of its limits.

What is claimed is:

1. The method of making a zinc product particularly adapted for agricultural uses and consisting essentially of zinc oxysulphate having a molar ratio of approximately 5.0–5.5 parts of zinc to one part of sulphur which comprises forming an aqueous slurry containing approximately five mols of zinc oxide, forming an aqueous solution containing approximately one mol of sulphuric acid, adding the zinc oxide slurry to the acid solution and agitating the mixture while maintaining a reaction temperature of about 180°–190° F. until the pH of the mixture increases to about 6.0–6.5, the amount of solids in said mixture being about 25–35% by weight, thereby precipitating said zinc oxysulphate in the hot mixture in finely divided form, then cooling the mixture to about 80°–100° F., then adding to the mixture an amount of calcium hydroxide sufficient to precipitate the zinc remaining in solution, and then spray drying the mixture.

2. The method of making a zinc product consisting essentially of zinc oxysulphate having a molar ratio of approximately 5.0–5.5 parts of zinc to one part of sulphur which comprises forming an aqueous slurry containing zinc oxide and zinc sulphate in the approximate proportions of four mols of zinc oxide to one mol of zinc sulphate, the maximum solids content of said slurry being about 35% by weight, agitating the slurry while maintaining a reaction temperature of about 180° F. until the pH of the slurry increases to about 6.0–6.5, thereby precipitating said zinc oxysulphate in the hot slurry in finely divided form, then cooling the slurry at least to about 100° F., then adding to the slurry an amount of calcium hydroxide sufficient to precipitate the zinc remaining in solution, and separating and drying the precipitate.

WARREN D. WARINNER.
EDWARD H. CONROY.

REFERENCES CITED

The following references are of record in the file of this patent:

UNITED STATES PATENTS

| Number | Name | Date |
|---|---|---|
| 1,074,203 | Rees et al. | Sept. 30, 1913 |
| 1,204,843 | Bretherton | Nov. 14, 1916 |
| 1,906,074 | Mertes | Apr. 25, 1933 |
| 1,912,332 | Steinbring | May 30, 1933 |

FOREIGN PATENTS

| Number | Country | Date |
|---|---|---|
| 302,924 | Great Britain | Mar. 20, 1930 |

OTHER REFERENCES

Mellor, Comprehensive Treatise on Inorganic and Theoretical Chemistry, vol. 4, Longmans, Green & Co., N. Y. (1923), pages 625–626.